Feb. 9, 1960  A. G. F. RAMBOLD  2,923,936
APPARATUS FOR APPLYING STAPLES TO TEA BAGS AND THE LIKE
Original Filed March 14, 1952  18 Sheets-Sheet 1

INVENTOR
Adolf G.F. Rambold
BY
Curtis, Morris + Safford
ATTORNEYS

Feb. 9, 1960     A. G. F. RAMBOLD     2,923,936
APPARATUS FOR APPLYING STAPLES TO TEA BAGS AND THE LIKE
Original Filed March 14, 1952     18 Sheets-Sheet 2

INVENTOR
Adolf G.F. Rambold
BY
Curtis, Morris + Safford
ATTORNEYS

Feb. 9, 1960 A. G. F. RAMBOLD 2,923,936
APPARATUS FOR APPLYING STAPLES TO TEA BAGS AND THE LIKE
Original Filed March 14, 1952 18 Sheets-Sheet 3

INVENTOR.
Adolf G. F. Rambold
BY
Curtis Morris + Safford
ATTORNEYS

Feb. 9, 1960  A. G. F. RAMBOLD  2,923,936
APPARATUS FOR APPLYING STAPLES TO TEA BAGS AND THE LIKE
Original Filed March 14, 1952  18 Sheets-Sheet 4
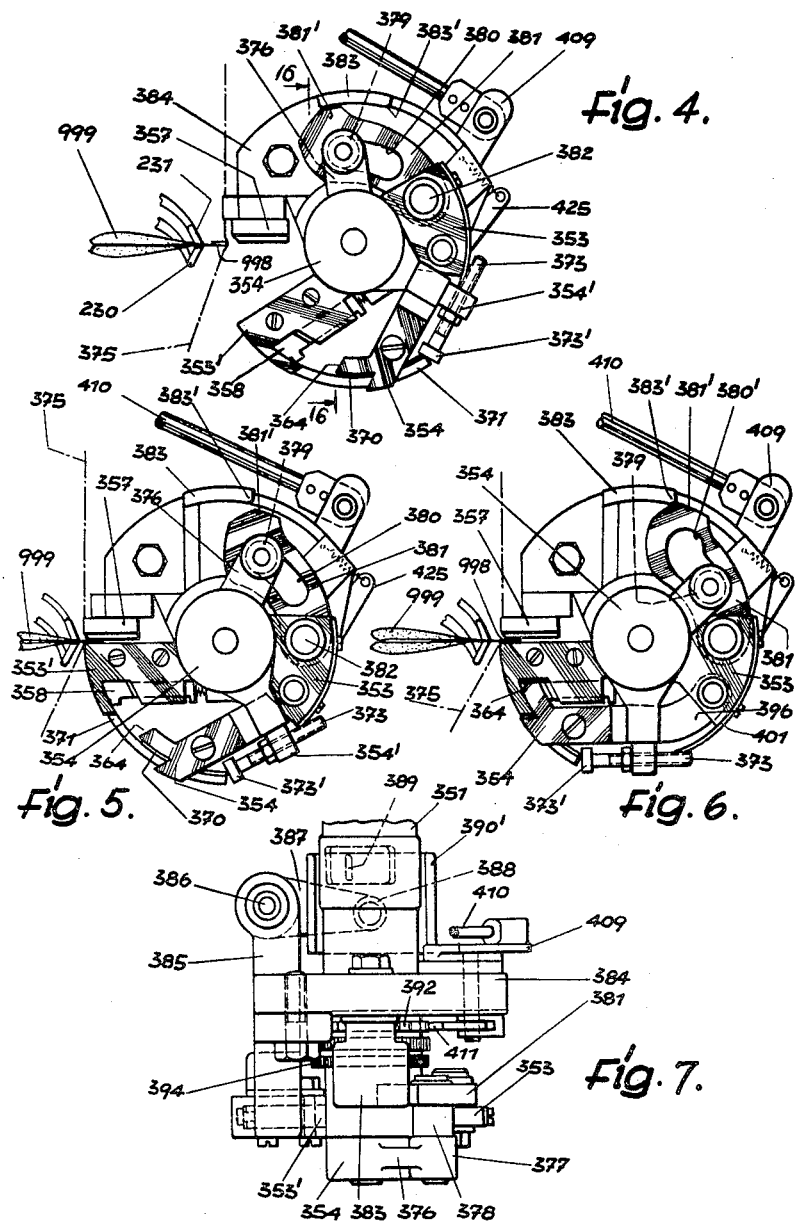
INVENTOR
Adolf G.F.Rambold
BY
Curtis, Morris + Safford
ATTORNEYS Feb. 9, 1960     A. G. F. RAMBOLD     2,923,936
APPARATUS FOR APPLYING STAPLES TO TEA BAGS AND THE LIKE
Original Filed March 14, 1952     18 Sheets-Sheet 5
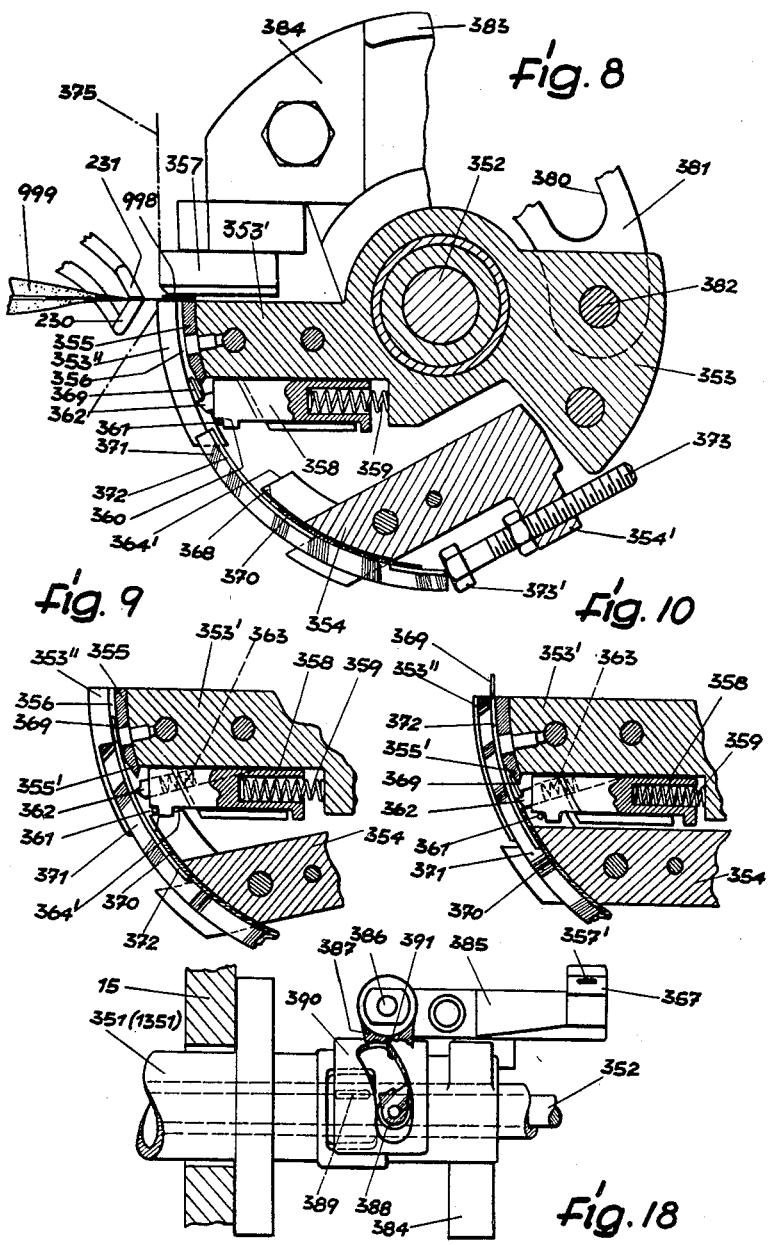
INVENTOR
Adolf G.F.Rambold
BY
Curtis, Morris + Safford
ATTORNEYS

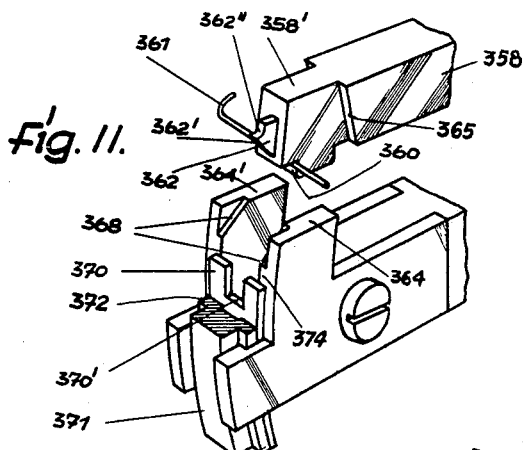
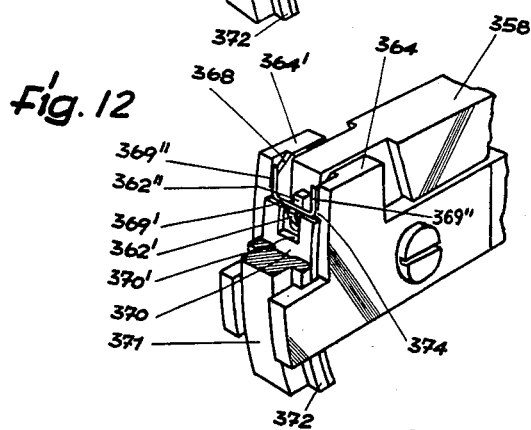
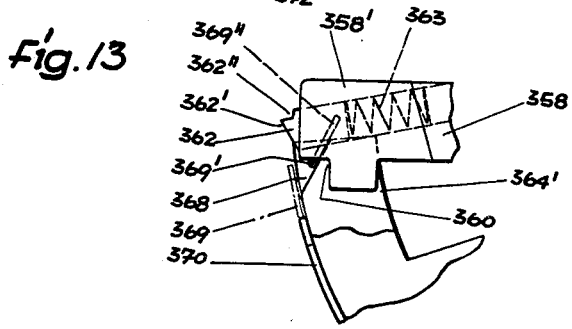

Feb. 9, 1960         A. G. F. RAMBOLD         2,923,936
APPARATUS FOR APPLYING STAPLES TO TEA BAGS AND THE LIKE
Original Filed March 14, 1952                    18 Sheets-Sheet 8
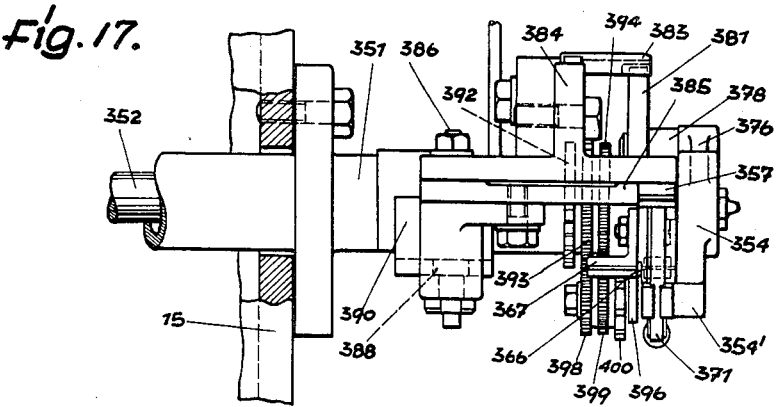
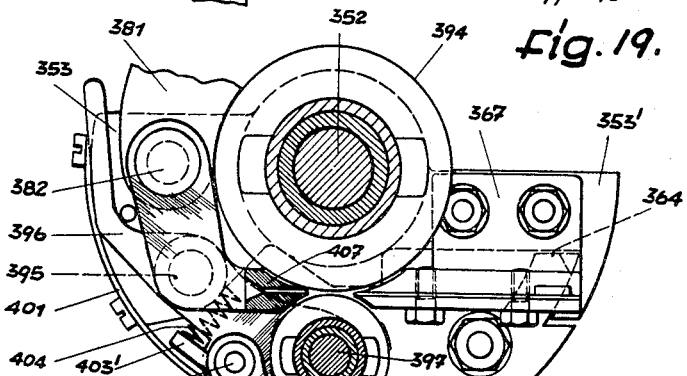
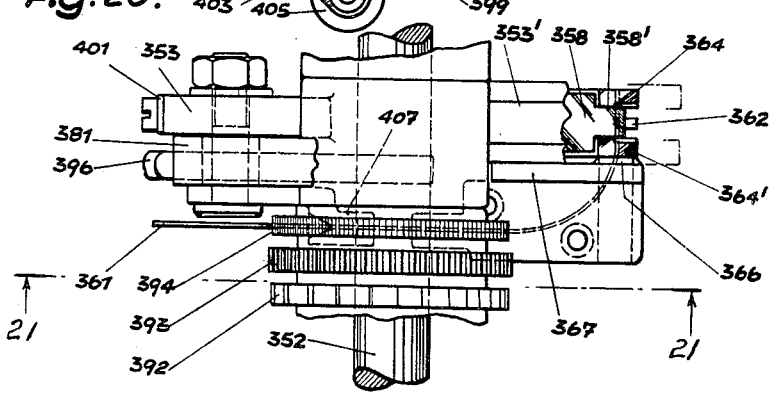
INVENTOR
Adolf G. F. Rambold
BY
Curtis, Morris & Safford
ATTORNEYS

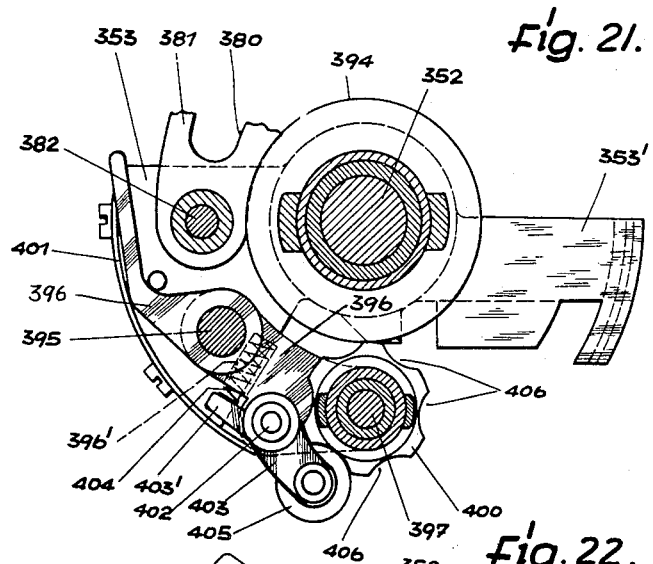
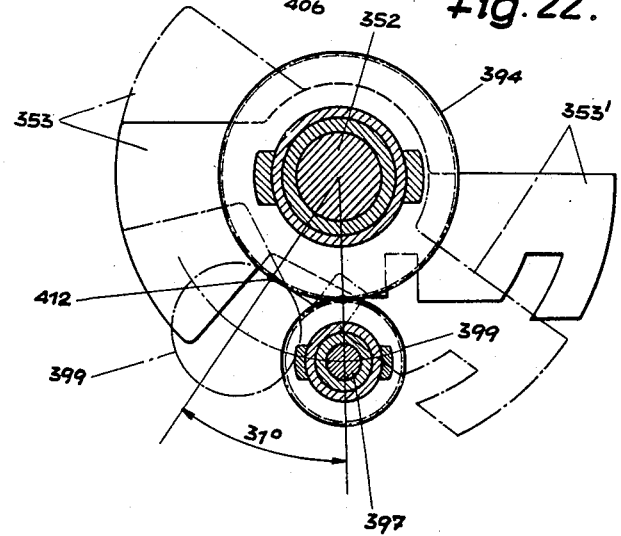

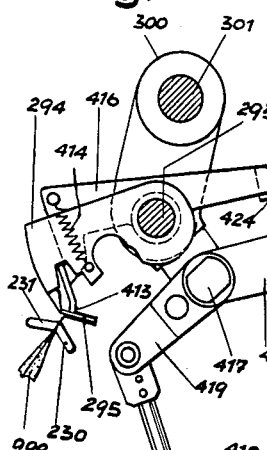
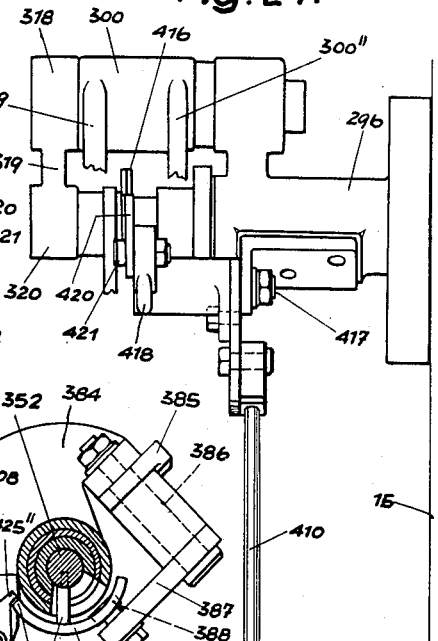
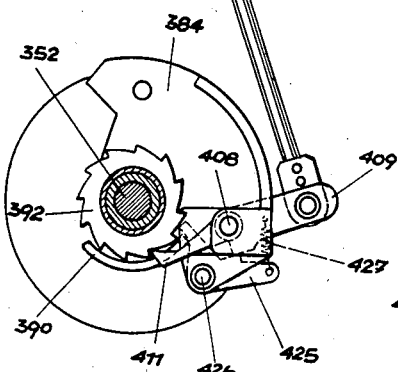
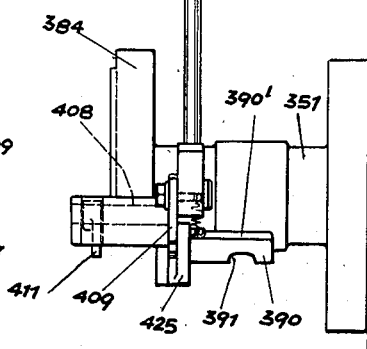
Fig. 23.  Fig. 24.  Fig. 25.

Feb. 9, 1960 A. G. F. RAMBOLD 2,923,936
APPARATUS FOR APPLYING STAPLES TO TEA BAGS AND THE LIKE
Original Filed March 14, 1952

INVENTOR
Adolf G.F.Rambold
BY
Curtis, Morris + Safford
ATTORNEYS

Feb. 9, 1960 A. G. F. RAMBOLD 2,923,936
APPARATUS FOR APPLYING STAPLES TO TEA BAGS AND THE LIKE
Original Filed March 14, 1952 18 Sheets-Sheet 12
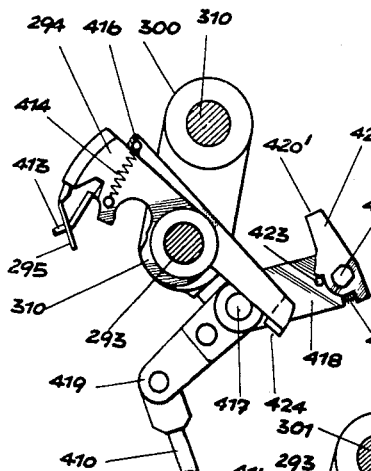
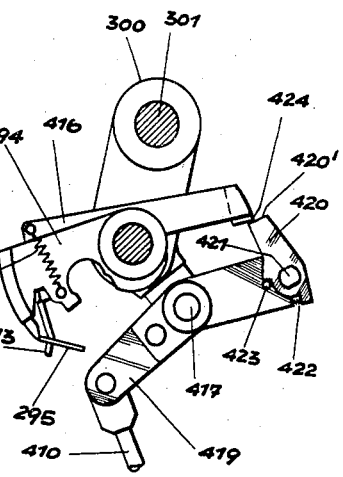
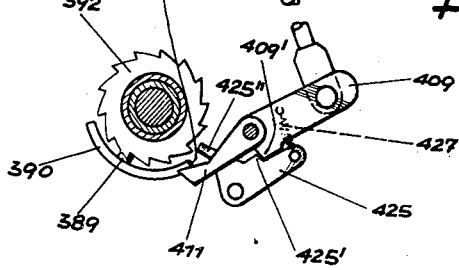
INVENTOR
Adolf G.F.Rambold
BY
Curtis, Morris & Safford
ATTORNEYS Feb. 9, 1960  A. G. F. RAMBOLD  2,923,936
APPARATUS FOR APPLYING STAPLES TO TEA BAGS AND THE LIKE
Original Filed March 14, 1952  18 Sheets-Sheet 13

INVENTOR.
Adolf G. F. Rambold
BY
Curtis Morris & Safford
ATTORNEYS

Feb. 9, 1960 A. G. F. RAMBOLD 2,923,936
APPARATUS FOR APPLYING STAPLES TO TEA BAGS AND THE LIKE
Original Filed March 14, 1952 18 Sheets-Sheet 14

INVENTOR
Adolf G. F. Rambold
BY
Curtis, Morris + Safford
ATTORNEYS

Feb. 9, 1960 A. G. F. RAMBOLD 2,923,936
APPARATUS FOR APPLYING STAPLES TO TEA BAGS AND THE LIKE
Original Filed March 14, 1952 18 Sheets-Sheet 15
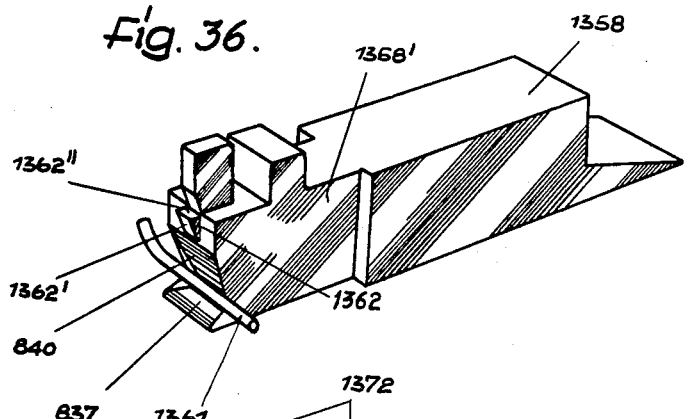
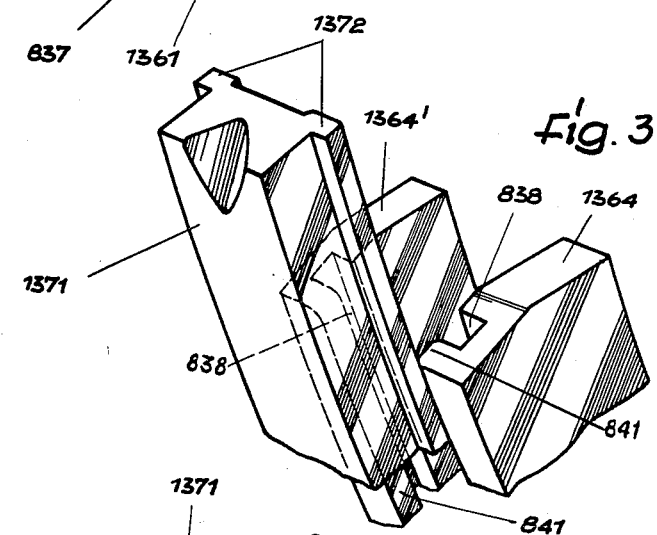
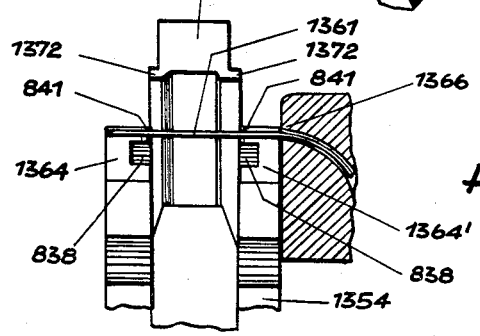
INVENTOR
Adolf G. F. Rambold
BY
Curtis, Morris + Safford
ATTORNEYS

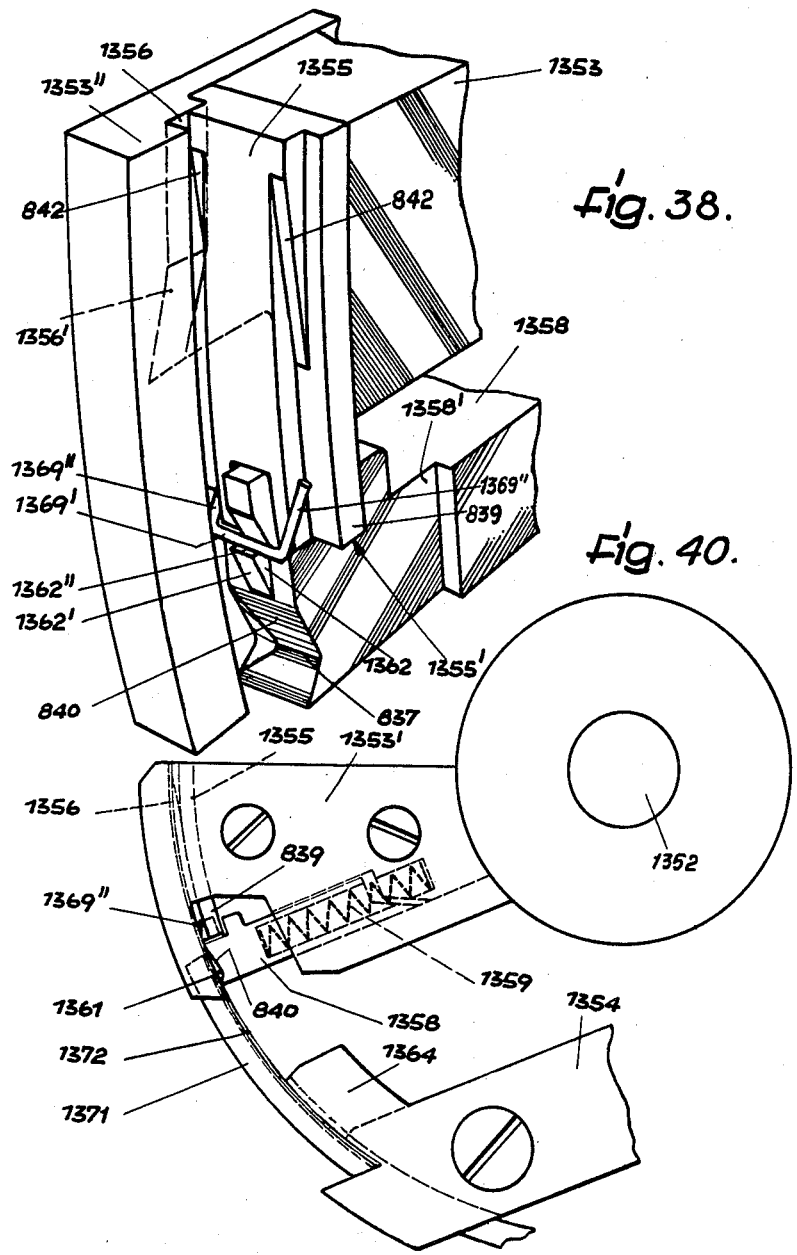

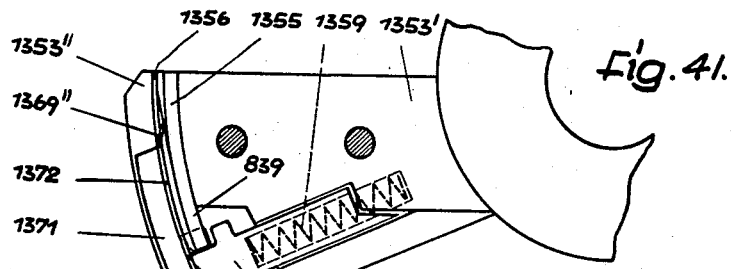
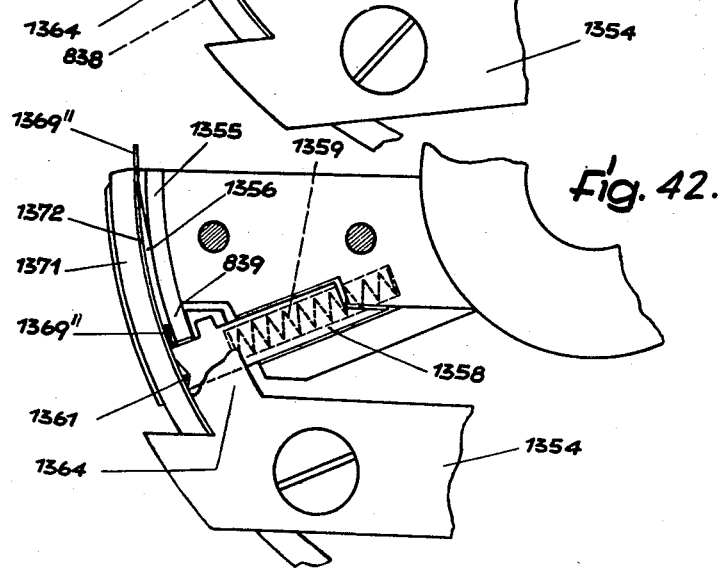
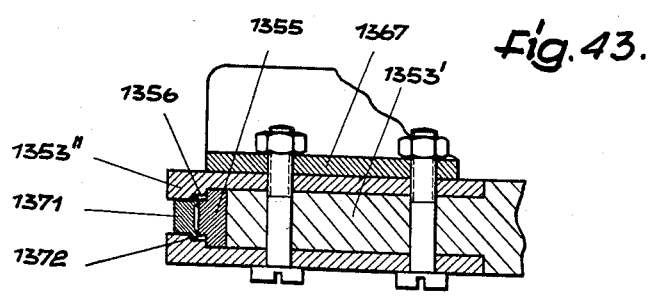

Feb. 9, 1960   A. G. F. RAMBOLD   2,923,936
APPARATUS FOR APPLYING STAPLES TO TEA BAGS AND THE LIKE
Original Filed March 14, 1952   18 Sheets-Sheet 18
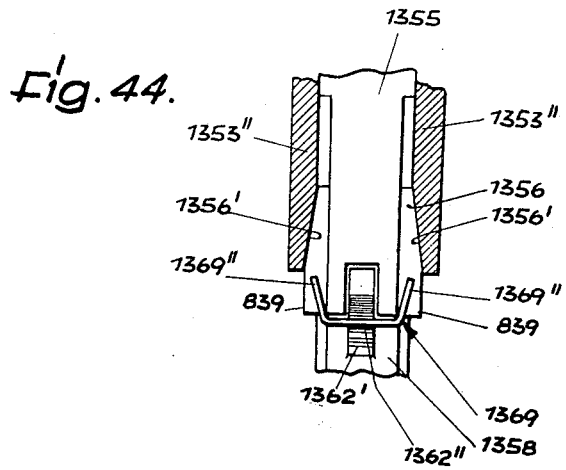
INVENTOR
Adolf G.F.Rambold
BY
Curtis, Morris & Safford
ATTORNEYS

United States Patent Office 2,923,936
Patented Feb. 9, 1960

2,923,936

APPARATUS FOR APPLYING STAPLES TO TEA BAGS AND THE LIKE

Adolf G. F. Rambold, Buderich near Dusseldorf, Germany, assignor to Teepack Spezialmaschinen, G.m.b.H., Viersen, Rhineland, Germany, a company of Germany Original application March 14, 1952, Serial No. 276,537, now Patent No. 2,823,502, dated February 18, 1958. Divided and this application November 30, 1956, Serial No. 625,306

10 Claims. (Cl. 1—2)

This invention relates to a mechanism for forming and applying staples to tea bags, for example, in the course of automatic production of such bags.

This application is a division of U.S. application Serial No. 276,537, filed March 14, 1952, now U.S. Patent No. 2,823,502.

An object of this invention is to provide a simple and improved mechanism for forming and driving staples one at a time into tea bags at precisely timed instants during continuous production of the bags.

Another object is to provide such a mechanism which operates reliably and rapidly in conjunction with other parts in an overall machine.

Still another object is to provide a mechanism of this kind which is compact in size and relatively inexpensive though easy to service and maintain and very efficient and positive in operation.

These and other objects will in part be pointed out in and in part understood from the description given hereinafter.

The various features of the invention covered by this patent are illustrated principally in Figures 3 through 44 of the drawings. The invention is particularly useful as part of a complete machine, described and claimed in U.S. Patent No. 2,823,502, for forming, filling, closing and wrapping tea bags automatically in continuous production at high speed.

The operation of the machine for manufacturing, filling and closing of bags or the like which includes the improved stapling mechanism for forming staples and driving them one at a time into work pieces in continuous production and which is illustrated in Figures 1 and 2 is briefly as follows. A continuous strip of liquid-pervious bag-forming material is fed from a bobbin G by a feed-roller-assembly K to a means L which forms a continuous tube from the strip. Between the feed-roller-assembly K and the tube forming means L are arranged dosing means D for depositing equal quantities of tea or the like at spaced intervals along the strip before the tube has been formed. Moving means P arranged behind the tube forming means L moves the tube to a device C which cuts from the tube segments of equal length, each segment containing two quantities of the tea substance. Such tube segments then are each inserted by a folding mechanism B in one of the segment receiving zones of an intermittently movable first conveyor wheel M, the folding mechanism B simultaneously forming between the two tea substances contained in the tube segment a W-shaped transverse bottom-fold for the bag to be manufactured. The ends of each tube segment are held by levers pivotally mounted on the conveyor wheel M during the transport of the bag segments. Around conveyor wheel M a plurality of devices is arranged in spaced relation for closing the bag, including a first folding device $F_1$ and a second folding device $F_2$ for closing and folding over upon each other the two ends of each tube segment. Further included is a stapling mechanism $H_1$, which is the object of the present invention and by which a staple is formed and driven into the closing fold formed by the folding devices $F_1$ and $F_2$. Simultaneously with the driving of a staple into the folded ends of the bag a thread is fastened to it by the staple.

About the conveyor wheel M are further arranged a device A for cutting and guiding the thread, and a reversing and transferring means U which turns each bag 180° and simultaneously wraps the thread around it, and then transfers it to an intermittently moved second conveyor wheel N. This second wheel N has a plurality of cavities for receiving the bags and has arranged around it a plurality of operating devices in spaced relation, one of which is the reversing and transferring device U.

Before each respective cavity of the second conveyor wheel N is moved opposite the reversing and transferring device U, an envelope blank is fed from a blank-supply O and prepared by an envelope feeding and preparing device Z by which a tag is partially stamped out from the blank. One envelope blank is inserted by an inserting device E into each cavity of the second conveyor wheel N and then this cavity is advanced to the next station of conveyor wheel N where it receives and embraces a bag from the reversing and transferring means U.

Another device arranged around the second conveyor wheel N is a second staple mechanism $H_2$, like staple mechanism $H_1$, which second staple mechanism forms a staple and drives it into the tag preformed in the blank envelope thereby simultaneously fastening to the label the second or free end of the thread wrapped around the bag.

Each bag surrounded by an envelope blank is then operated on by a folding device V and formed into a finished article having a jacket with an opening flap and closed along its side edges. The latter are knurled or crimped together by a device R which simultaneously removes the jacketed bags successively from the second conveyor wheel N and stacks them into a rack ST for packaging the jacketed bags into cartons.

In accordance with a specific embodiment of this invention, there is provided a staple forming and driving mechanism comprising stape forming and guiding members concentric with a combined driving and bending die, the members and die being all mounted on a single rotary shaft. The shaft is oscillated back and forth in synchronism with other parts of the overall tea bag machine so that at precisely the right moments a staple will be applied to each bag as it comes along. In the event that a bag fails to arrive when it should, the staple mechanism is controlled so that no staple is formed for the missing bag, the mechanism thereafter making a stroke though not driving a staple. Thus no unused staples, which might otherwise clog or jam the machine, are produced.

The structure of the staple forming and driving mechanism is compact and its operation is positive and very efficient. On each forward stroke of the driving and bending die, a staple formed on the previous stroke is driven into the work and simultaneously another staple is formed from a straight, short length of wire. During the reverse stroke of this die, the just formed staple is positively advanced into the path of driving die and, if permitted by an interlock member which senses the presence or absence of the advancing tea bags, a short length of wire is fed to the forming members. Upon the next forward stroke of the mechanism the staple just positioned in the path of the driving die is driven into the work and a new staple is formed, and so on. If the interlock member has previously signaled that a tea bag will not arrive at a particular interval, no wire will have been fed to the forming member and consequently no staple will have been formed so that when the driving die makes its forward stroke at this particular interval no staple is driven, though, of course, the next staple will be formed, if required.

The configuration of the forming member is such that, when a proper length of wire is fed to it, a staple will be positively formed and held until the driving die is retracted, whereupon the formed staple is positively advanced into the path of the driving die and held properly positioned until this die contacts the staple and drives it into the work. The action of the forming member is automatically controlled by the position of the staple being formed and by the position of the driving die so that no external linkage between these elements is required. This makes for a very compact structure.

A better understanding of the invention together with a fuller appreciation of its many advantages will best be gained from a study of the following description given in connection with the accompanying drawings. These show an illustrative embodiment of an overall tea bag machine and its different parts drawn to various scales.

Figures 4 through 6 are side views of the staple forming and driving mechanism in the initial, intermediate, and final stages respectively;

Figure 7 is a top plan view of the device of Figure 4;

Figure 8 is a broken away sectional view of Figure 5;

Figure 9 is a partial sectional view showing the device in a stage intermediate that of Figures 5 and 6;

Figure 10 is a detailed partial sectional view of the lower staple driving portion in the final position of Figure 6;

Figure 11 is an exploded perspective view of the staple forming portion of the device of Figures 4-6;

Figure 12 is a perspective view similar to that of Figure 11 showing the parts in their assembled position;

Figure 13 is a partial sectional view of the staple forming dies in intermediate position;

Figure 17 is a side view of the wire feeding mechanism for the device of Figures 4-6;

Figure 18 is a bottom plan view of the anvil pivoting lever and cam for the device of Figures 4-6;

Figure 19 is a partial sectional side view taken from the opposite side from that of Figures 4-6 showing the wire feeding device and controls therefor;

Figure 20 is a top plan view of Figure 19;

Figure 21 is a sectional view taken on line 21—21 of Figure 20;

Figure 22 is a sectional view similar to Figure 21 with certain parts removed and showing the initial and final positions of the arm 353;

Figure 23 is a side view partially broken away showing the interconnection between the wire feeding device and the first fold forming device;

Figure 24 is an end view of the device of Figure 23;

Figure 25 is a side view of the lower portion of Figure 23 showing the side opposite from that shown in Figure 23;

Figures 30 and 31 are fragmentary views of the feeler arm of the sealing-fold forming device for the wire feeding interlock mechanism of Figure 23, showing the sequence of operation when no bag is present in the fold forming device;

Figure 32 shows the final step in the operation of the feeling arm of Figures 30 and 31 and its effect on the wire feeding device;

Figure 36 is a detailed perspective view of the male wire forming die;

Figure 37 is an exploded perspective view of the driving die for inserting the staple;

Figure 38 is an assembled perspective view similar to that of Figure 35 showing the device one step further advanced in its operation;

Figure 39 is a top plan view of the wire forming and staple driving dies;

Figure 40 is an enlarged partial elevational view of the stapling device at the beginning of the staple driving stroke;

Figure 41 is a view similar to Figure 40, showing a more advanced position of the driving operation;

Figure 42 is a view similar to Figure 41, showing the dies in their final position after driving of the staple;

Figure 43 is a horizontal sectional view of the staple guides; and

Figure 44 is a vertical sectional view of the correcting guides in the staple channel of the first conveyor stapling device.

Figure 1:
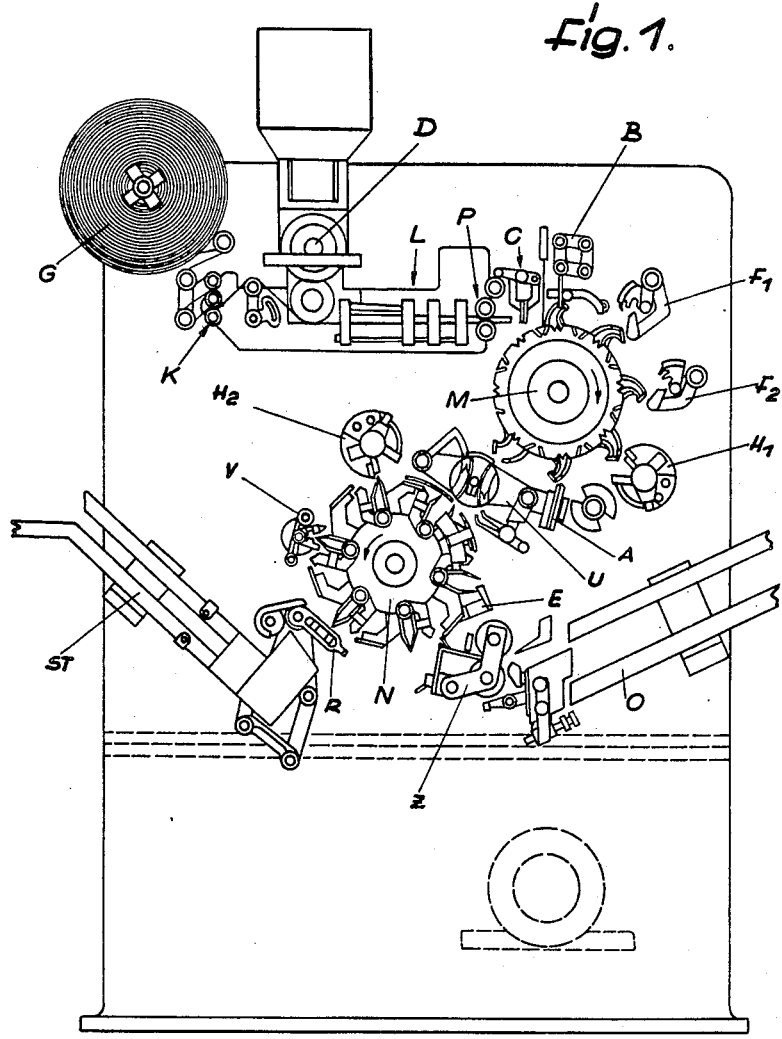
Figure 1 is an overall schematic view showing the relative positions of the various elements of the machine, together with the general layout thereof.

Figure 1 shows a side view of a machine for making, filling and closing tea bags. This machine is described in detail and claimed in the aforesaid U.S. patent. Included as part of this machine is a mechanism (indicated at $H_1$ and $H_2$) for the forming and subsequent driving of wire staples into the tea bags during the course of their manufacture. Two embodiments of this mechanism are described and claimed herein.

Figure 2:
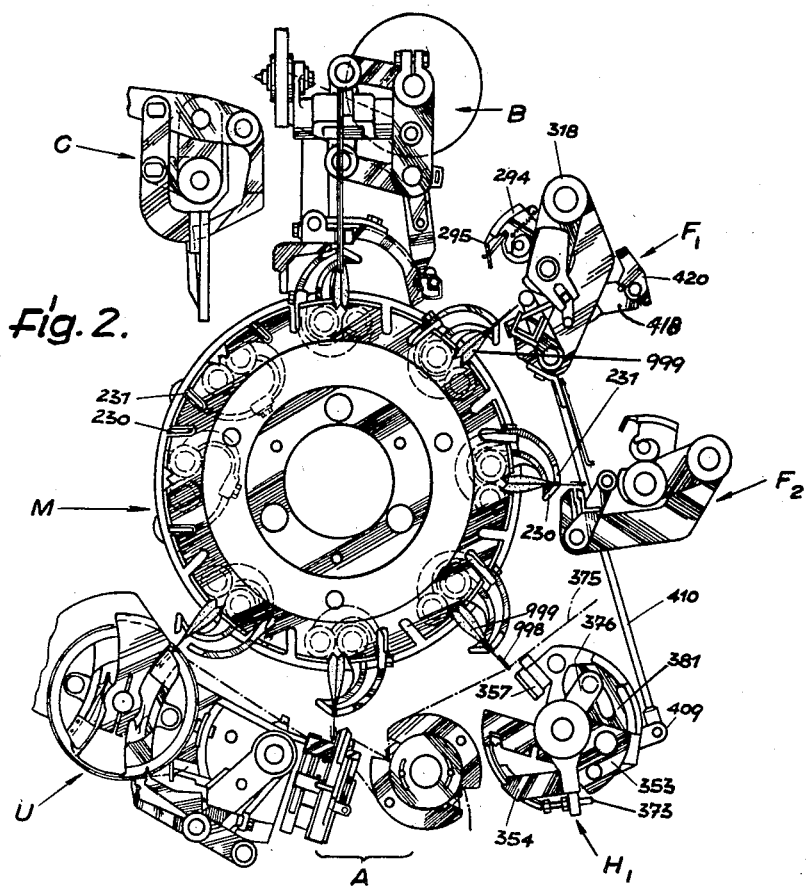
Figure 2 is an enlarged portion of the machine in Figure 1, showing the tea bag forming elements and a staple forming and driving mechanism.
Figure 3:
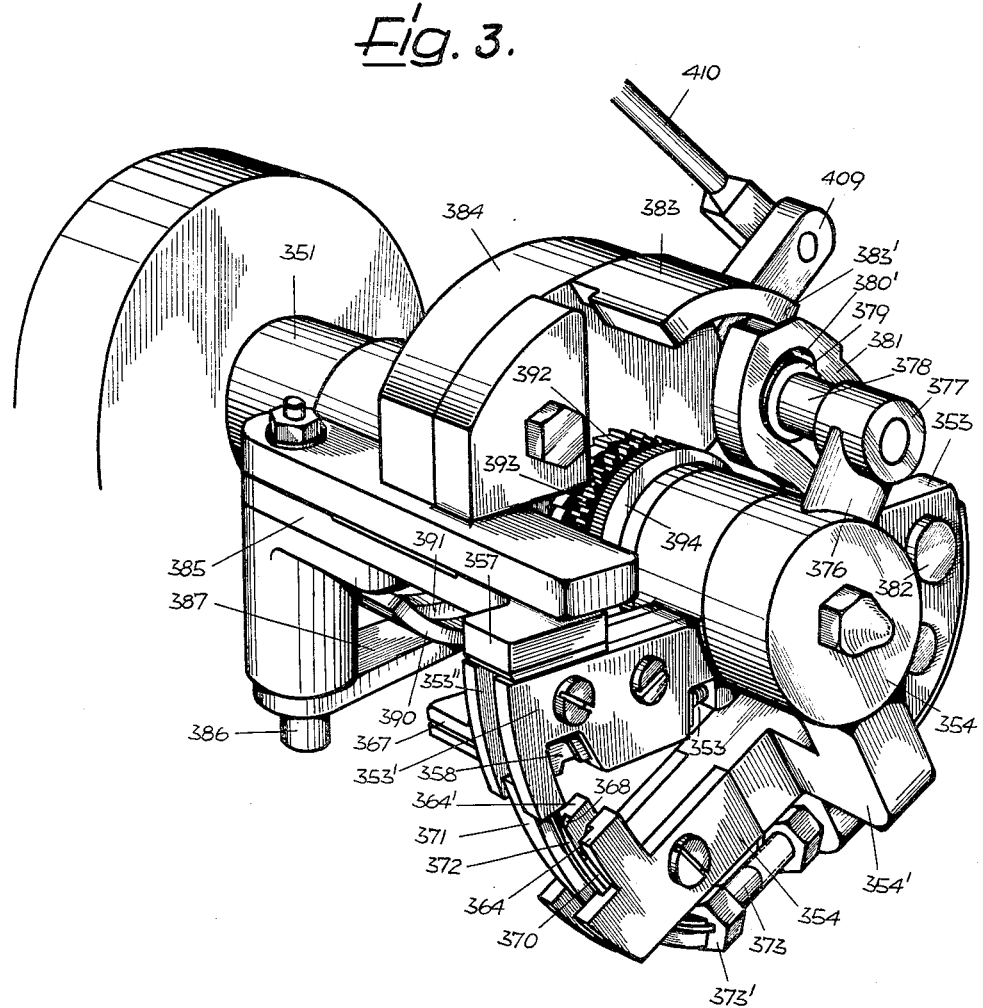
Figure 3 is an enlarged perspective view of one embodiment of a staple forming and driving mechanism.

Figure 2 is an enlarged portion of Figure 1 and shows the relationship of the stapling mechanism to other portions of the machine. The particular mechanism shown here is shown in greater detail in Figures 4-16. However, a preferred embodiment of this mechanism is shown in Figures 33-44 and will be described first. The device for feeding wire to the staple forming and driving mechanism is shown and its action illustrated in Figures 17-32. This device is suitable for use with either embodiment of the stapling mechanism.

*Device for attaching the sealing staple and the thread*

The parts which form the sealing staple are to be differentiated from the parts which attach the sealing staple to the sealing fold and at the same time fasten the thread. The device is constructed in such a way that in one working operation one sealing staple is formed and simultaneously the sealing staple, formed by the previous working operation, is forced into the sealing fold.

The preferred form of the device for attaching the sealing staple and the thread is shown in Figures 33 to 44.

In forming the sealing staple the following parts are used:

On a shaft 1352 (Fig. 34), which is driven by the main drive of the machine and mounted on machine frame 15 by means of a bearing, an outer cover 1353 is rotatably mounted, which in turn is pivoted around shaft 1352 on a die bearing arm 1354 which is fixed on shaft 1352. The outer cover 1353 carries on one arm 1353' (Figs. 38 and 40) a staple guide which consists of outer guides 1353" fixed on arm 1353' and inner guide 1355 which is preferably interchangeably mounted on arm 1353'.

The staple guide, consisting of parts 1353" and 1355 which form a channel 1356, is positioned against anvil 1357 (Fig. 34) at the end of the pivotal movement of outer cover 1353, during which movement the sealing folding of bag 999, led in by conveyor wheel M, is being placed between anvil 1357 and the front surfaces of parts 1353'' and 1355.

A guide 1358 (Figs. 38 and 40) for wire 1361 is slidably mounted under the pressure of a spring 1359. This guide 1358 has a cavity 837 (Fig. 35) on its front side in which the wire 1361 lies parallel to shaft 1352. The staple 1369 is made from this wire. On the front side of guide part 1358 a nose 1362 is mounted extending outward.

The die bearing arm 1354 (Figures 34 and 40) carries a pair of parallel bending dies 1364 and 1364' which slide on their inner sides along part 1358' of guide 1358, as they reach guide 1358 upon pivoting and, upon further pivoting, the notches 838 (Fig. 37) mounted on their inner sides engage the ledges 839 (Fig. 38) which are arcuate in form and mounted on the inner guide 1355.

As the bending dies 1364 and 1364' are swung upward along the front part 1358' of guide 1358, they contact wire 1361 lying in cavity 837 (Figs. 39 and 41) and cut off the portion of the wire 1361 which is going to be formed into a staple 1369 upon further forward movement of the bending dies 1364 (Fig. 42). This cutting off is performed by the moving of bending die 1364' along a counterblade 1366 which is mounted on a part 1367 which in turn is fixed on outer cover 1353.

During this movement of bending dies 1364 and 1364' the wire 1361 which is located in cavity 837 (Fig. 36) is pushed upward along the slanting front part 840 of part 1358' and along front part 1362' of nose 1362 (Fig. 36). At the same time guide 1358 moves radially inward against the spring pressure, because wire 1361 itself cannot move radially outward inasmuch as channel 1356 is filled with ledges 1372 of die 1371 (Fig. 42) as will be explained later.

When the wire reaches the undersurface 1355' of guide part 1355 (Fig. 35), it has moved above a step 1362'' in nose 1362, thus enabling guide 1358 to move radially outward again under the pressure of spring 1359 and thus positioning the wire 1361 between step 1362'' of nose 1362 and undersurface 1355' of part 1355.

During the further upward pivotal movement of bending dies 1364 and 1364' the sides 1369'' of the staple 1369, to be formed out of the wire 1361, are bent upward by the edges 841 of bending dies 1364 and 1364' by which process staple 1369 is completed.

Die bearing arm 1354 carries, in addition to bending dies 1364 and 1364', the previously mentioned driving die 1371 (Fig. 40) which effects the punching of staples 1369 into the sealing fold 998 of bag 999. This die 1371 can be adjusted according to the swinging movement of the dies, toward or away from the bending dies 1364 and 1364'. This adjustment is done by an adjusting screw 1373 (Fig. 34) which is screwed into an eye 1354' of die bearing arm 1354 and lies with its head 1373' on one end of die 1371.

Ledges 1372 of die 1371 and 838 of part 1355 form a chute as long as die 1371 stands during its swinging movement opposite ledges 838. The sides 1369'' of staple 1369 are located in this chute as long as web 1369' of staple 1369 is situated between undersurface 1355' of part 1355 and stop 1362'' of nose 1362.

At the same time when staple 1369 is being formed at this point, the die 1371 (Fig. 42) is punching into fold 998 of bag 999 staple 1369 which was formed during the earlier operation.

As die arm 1354, which carries bending dies 1364 and 1364' and die 1371 moves back, the channel 1356, up to this time filled with ledges 1372 of die 1371 becomes free as soon as the front part of die 1371 moves below the undersurface 1355' of part 1355. In this way the guide part 1358 is released to move radially outward under the pressure of spring 1359 and to press staple 1369 outward into the channel 1356. Now staple 1369 is in position ready to be punched in (Fig. 38).

During the following swinging forward of the die arm 1354 this staple 1369 is punched in and the next staple is formed from a new piece of wire fed in by the wire feeding device described below. While moving forward, the front part of die 1371 meets the web 1369' of staple 1369 and pushes the staple ahead through the chutes into channels 1356.

During this forward-pushing movement (Fig. 44), the sides 1369'' of staple 1369, if they are not already in the channels 1356, meet guideways 842 which form a bridge from the front surfaces of ledges 839 to the front surface of 1355 which borders channels 1356, and lead the sides 1369'' into the channels 1356 in which the sides are further guided until they are punched into the sealing fold.

In case the sides 1369'' are not bent exactly at right angles to web 1369'', convergent surfaces 1356' of channels 1356 are provided to adjust sides 1369''.

The drive of outer cover 1353 and die arm 1354 is produced in the same way as described hereafter for outer cover 353 and die arm 354.

An alterative embodiment for the staple forming and attaching mechanism is as follows (Figures 3–17):

An outer cover 353 is rotatably installed on a shaft 352, driven by the main drive of the machine and mounted in machine frame 15 by a sleeve 351, and is rotated around shaft 352 by a die bearing arm 354 which is fixed on shaft 352 (as will be described later).

Figure 15:
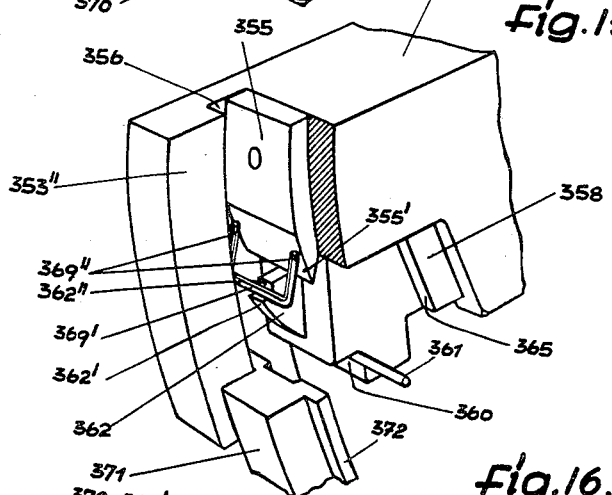
Figure 15 is a detailed perspective view of the final staple position preparatory to driving thereof.
Figure 16:
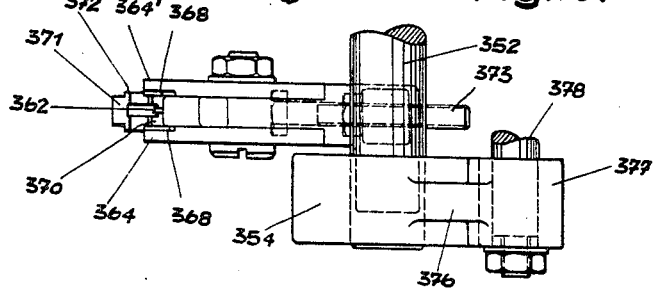
Figure 16 is a partial top plan view partly broken away taken approximately on line 16—16 of Figure 4.

Referring to Fig. 15 the outer cover 353 carries on one arm 353' a staple guide which is composed of the outer guide part 353'', which in turn is fixed on arm 353, and an inner guide part 355 (Fig. 15), which is removably installed. The staple guide, consisting of parts 353'' and 355, forms a channel 356, at the end of the rotation against anvil 357 (Fig. 8), through which the staple may be fed to the sealing fold of the bag introduced between anvil 357 and staple guide 353'', 355, 356 by conveyor wheel M.

On the arm 353' a bending die 358 is removably positioned opposite to work against a spring 359. This bending die 358 has a step 360, in which wire 361, from which the staples are formed, lays, and which is parallel to shaft 352. On the front of bending die 358 a nose 362 is removably positioned so as to be urged outward by spring 363.

The die bearing arm 354 carries two parallel bending die faces 364, 364', the inner sides of which are opposite the shoulders 365 of the bending die 358 in the position of Figure 12.

The bending dies 364, while being swung along the front part 358' of guide 358, catch the wire 361 lying in step 360 and fold it around the sides of part 358' after the part of the wire 361, which has to be formed into a staple, has been cut off from the continuous wire by the bending die 364', which acts as a blade. This cutting is effected by the movement of bending die 364' along a blade 366 (Fig. 20) which is fixed on a plate 367 which is fixed on the outer cover 353.

The bending dies 364 have sliding surfaces 368 at the sides facing each other, which receive the sides 369'' of the formed staple 369 and pushes the web 369' of staple 369 outward. Below the sliding surfaces 368 a fork-shaped conveyor die 370 is installed which is fixed on die bearing arm 354 adjacent the bending dies 364. Outside this conveyor die 370 another die 371 is installed. This die 371 is led by rails 372 in corresponding guides of die bearing arm 354 and is adjustable in the direction of rotation of the bending dies 364 and the conveyor die 370. This adjustment is effected by a regulating screw 373 which is screwed into one eye 354' of die bearing arm 354 and lies with its nose 373' at one end of die 371.

Die 371 forms a channel together with the parts 374 of bending dies 364, which are next to the sliding surfaces 368. This channel is concentric with channel 356 but displaced inward one wire diameter and the inside width of the channel is a bit wider than the diameter of the wire.

As already mentioned, web 369' is pressed outward during and after bending of staple 369 by the sliding surfaces 368 (Figs. 11 and 13), so that web 369' is pushed into the channel formed by die 371 and surface parts 374, where the web is placed on the front side of conveyor die 370.

During this movement the sides 369" of staple 369 pivot around the edges which are formed by the surface parts 374 and the sliding surfaces 368, and at the same time staple 369 turns upright in such a way that its sides 369" lie tangentially to the arc of the front surface of conveyor die 370 as die bearing arm 354 swings around shaft 352.

In raising the staple 369 this way, its web 369' is brought out of step 360 and is carried upward by the conveyor die 370 camming against and over nose 362 which at the same time partially retracts against the compression spring 363. After web 369' of staple 369 has advanced part way along frontside 362' of the retreating nose, web 369' enters a step 362" of the nose after the nose, under the action of spring 363, has temporarily entered notch 370' of the conveyor die 370 (Fig. 12).

The nose 362 presses the web 369' of the staple outward with its step 362" in such a way that web 369' first lies at the inner surface of driving die 371 and later, after retreat of die 371, against the inner surface of guiding part 353" (Fig. 8). While staple 369 is being led around nose 362 by the conveyor die 370, the sides 369" of staple 369 are placed against a sliding surface 355' of the inner guide part 355. This has the effect of driving die 371, while advancing later, catches web 369' of staple 369 and the sides 369" of the staple are led into the channel 356. As the die advances, the staple 369 is pushed by die 371 through the channel 356 until its sides 369" are knocked through the sealing fold of the bag against anvil 357, whereupon the sides 369" are folded behind the sealing fold. The anvil 357 usually has a cavity for this purpose.

In either of the above embodiments simultaneously with the knocking in of staple 369 into the sealing fold of the bag, a thread is also fastened to the bag, the other end of which will be attached to a label which will form part of the wrapper, all of which will be described later. In the device for attaching the sealing staple and the thread, the bags 999 are first connected to a continuous thread 375 which later is cut between adjacent bags.

The drive of outer cover 353 and of die bearing arm 354 works as follows, as the remaining operations, including the drive, are the same in both embodiments that will be described in relation to one only.

Die bearing arm 354 is fixed on shaft 352 which is driven in an oscillatory manner by the machine drive. Moving forward, the die arm moves around an angle of about 57°, for example. In the starting position the outer cover 353 has a lead of, for instance, 26° over the die arm 354. Both start swinging simultaneously. Taking this example, outer cover 353 has arrived at anvil 357 after a turn of 31°, while die bearing arm 354 still has to cover a distance of 26°. Coming back, die arm 354 runs back first 26° and then takes outer cover 353 with it for the balance of the way of 31°.

This sequence is effected by the following (Figures 4, 7): The die bearing arm 354 has fixed thereon a lever 376, whose end has an eye 377, in which a bolt 378 is fixed, which carries a roll 379. This roll runs in a closed curve 380 which forms part of a lever 381, which is hinged at 382 to the outer cover 353. The curve 380, which with lever 381 lies initially in an arc concentric with the shaft 352, has at its end, at which roll 379 rests in the starting position, an outward bend 380' (Fig. 4). The nose 381' of lever 381 is depressed during the above mentioned rotation of 31° by a cam surface 383 such that roll 379 cannot enter the concentrically formed part of curve 380 during the initial 31° rotation period of lever 381. The cam surface 383 is connected with the mounting 384 for shaft 352 and the entire device for attaching the sealing clamp and the thread. In this way outer cover 353 is led over the road from 318 by die bearing arm 354. After completing 31° of the way the nose 381' moves clear of the cam surface 383. At this time, the outer cover 353 is in contact with anvil 357. Outer cover 353 is therefore stopped, so that roll 379, urged further in an arcuate direction by die arm 354 tries to advance inside the curve 380. In this way the roll 379 swings lever 381 outward and moves out of bend 380' of curve 380 to enter the other part of the curve and make it possible for die arm 354 to finish the remaining 26° of the swinging movement. During this movement of 26° of die arm 354 the nose 381' contacts a sliding surface 383' of cam surface 383, providing a frictional force sufficient to maintain outer cover 353 against anvil 357.

Figure 14:
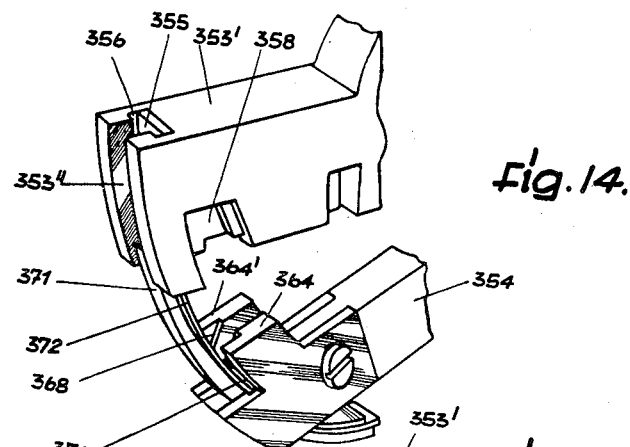
Figure 14 is a partial perspective view of the staple driving and forming dies.

Figure 4 shows the starting position. Figures 5, 14 and 15 show the positions after rotations of 31°. Figures 9 and 13 show the intermediate positions after die arm 354 has rotated further, and Figures 6, 10 and 12 show the final position after completion of the rotation of 26° by die arm 354 alone in addition to the common rotation of 31° of die arm 354 and outer cover 353. Figure 10 shows a staple 369, driven in by the anvil 357 during the balance of the rotation, and a staple 369 prepared for the next stitching, which waits to enter the channel 356. After the staple has been driven in by die 371, the die bearing arm 354 alone rotates back for an angle of 26°. As this rotation takes place, roll 379 runs along in curve 380. At the end of this rotation of die bearing arm 354, the roll 379 reaches the bent part 380' of lever 381 and enters therein, so that during the further rotation of die bearing arm 354 over the remaining 31°, outer cover 353 is coupled with die bearing arm 354, because the nose 381' of lever 380 is again depressed under the cam surface 383.

To insure the proper orientation of the sealing fold 998 of bag 999, which is between anvil 357 and outer cover 353 by the rotation of conveyor wheel M in a proper way, the anvil 357 is given a rotating motion such that it is swung out of the binding position while the nose-sealing fold 998 is swung into the binding position, and that anvil 357 after the nose-sealing fold 998 is in position is again swung into the binding position. Now the nose of sealing fold 998 lies against the lower side of anvil 357. The rotation of anvil 357 is effected by mounting anvil 357 on the end of lever 385 which is fixed on a bolt 386, which in turn is rotatably mounted on mounting 384. Also fixed on bolt 386 is another lever 387 which carries a roll 388 at its end. A surface 390 bent cylindrically around the axis of shaft 352 is fixed on shaft 352 by a radial pin. This surface 390 has a closed curve 391 in which a roll 388 runs. The curve is bent according to the desired movement of anvil 357.

While being swung into the binding position, the sealing fold 998 of bag 999 enters the path of thread 375 which is fed from above and runs down to the previously bound bag.

Through the combined motion of anvil 357 and outer cover 353, the thread 375 is put around sealing fold 998 in such a way that, while binding, it is caught on both sides of sealing fold 998 by the clamp 369.

*Feed of the wire for forming the staple*
*(Figures 17–32)*

The feed of the wire for forming the staple is effected by the following parts: Ratchet wheel 392, toothed wheel 393 and a wire-feeding roll 394 which has a knurled periphery are rotatably mounted as a unit. As seen in Figure 17 toothed wheel 398, which gears into wheel 393, and a wire-feeding roll 399, with knurled periphery, which works with feeding roll 394, and a locking wheel 400 are mounted on lever 396, which is rotatably mounted at 395 on outer cover 353 through bolt 397 (Figure 19). On outer cover 353 a flat spring 401 is installed, which presses against lever 396 and causes the toothed wheels and the wire-feeding rolls to engage one another. On lever 396 another two-armed lever 403 is fixed at 402, one side 403' of which is placed under the effect of a pressing spring 404 which is fixed on a step 396' of lever 396. On the other side of lever 403 a roll 405 is fixed which engages locks 406 (Figure 21) which are installed on the periphery of locking wheel 400. As seen in Figure 17 a guide 407 is installed in the direction of feed of the wire in front of wire feeding rolls 394 and 399 which leads the wire in between the feeding rolls. Behind feeding rolls 394 and 399 the wire 361 runs through an arc-like guide (Figure 20) into step 360 of bending clamp 358.

The toothed wheels 393 and 398 work like planetary gears. If wire feeding is to take place, a lock pawl 411 (Fig. 23) is in engagement with ratchet wheel 392, but if no feeding is contemplated, the lock pawl 411 is out of engagement.

The wire feeding takes place during the 31° while outer cover 353 and die bearing arm 354 are moving back. Therefore, while these two parts advance, no wire feeding takes place.

The outer cover 353 completes a rotation, through which movement lever 396 (Figure 21), fixed on the outer cover at 395, is rotated likewise. On lever 396 the lower wire feeding roll 399 (Figure 17), the toothed wheel 398 and locking wheel 400 are fixed. Locking wheel 400 and consequently wheel 398 and the lower wire feeding roll 399, all three of them being fixed as a unit, are secured against rotation by roll 405, fixed on the two-armed lever 403. Roll 405 is urged by spring 404 into a lock 406 of locking wheel 400. Toothed wheel 393 is geared to wheel 398. Wheel 393, wire feeding roll 394 and ratchet wheel 392 are also joined as a unit.

During the feed of outer cover 353 the toothed wheel 398 is arrested, while wheel 393 which meshes with 398, is rotatable on shaft 352. Therefore wheel 393 and also ratchet wheel 392 are taken along with toothed wheel 398 and cover 353. As can be seen from Figure 23 which is a view from the opposite side of the assembly from Figures 19, 21 and 22, locking wheel 392 has to move clockwise, while the effect of pawl 411 is eliminated. Therefore no relative movement between toothed wheels 393 and 398 takes place and neither therefore between wire feeding rolls 394 and 399. Thus the wire is taken along. The spot 412 of the wire (Figure 22), where it is caught by the wire feeding rolls, moves therefore through an arc of 31°, which corresponds to the periphery of the upper wire feeding roll 394.

The regular wire feed takes place relative to outer cover 353, while the outer cover 353 follows the die arm 354 to complete the remaining 31° after the latter has completed 26° of the return, since the wire remains arrested and the outer cover 353 completes its backward movement.

From Figure 23 it can be be seen that in this case the pawl 411 arrests the lock wheel 392 and therefore also toothed wheel 393 and upper wire feeding roll 394. Consequently, while outer cover 353 goes back, wheel 398 has to rotate like a planetary gear around the arrested wheel 393, while locking wheel 400 rotates against roll 405 and locks 406 against the pressure of spring 404. Consequently the lower wire feeding roll rotates correspondingly, i.e., it rolls along the wire while pressing it on the upper wire feeding roll 394. The wire therefore does not move in its longitudinal direction but has, at the end of the backward movement of outer cover 353 in relation to the original contact points on the wire feeding rolls 394 and 399, received a relative feed which measured in wire length is $31/360 \times \pi \times D$ where D corresponds to the diameter of the upper wire feeding roll 394 plus the diameter of the wire 361. This wire length equals the stretched length of a staple 369.

From the above it follows that no wire feed takes place, if during the backward movement of outer cover 353 pawl 411 is released. The release of pawl 411 is effected through a mechanism to be explained below, which is provided for the purpose of arresting the wire feed so that no staple is formed or knocked on the anvil 357, if no bag 999 is led into the binding device.

To illustrate the sequence of operation and interlocking relationship of this mechanism, reference is made to Figures 26 through 29 which characterize the different phases.

As mentioned before, during the rotation of outer cover 353 and die arm 354, a prepared staple 369 is knocked into the sealing fold 998 of a bag 999 by the driving die 371, and at the same time a second staple 369 is formed by the bending dies 364 and brought into feeding position by the conveyor die 370. During the joint backward movement of the outer cover 353 and die arm 354 a sufficient length of wire is fed for the forming of a staple 369.

In Figures 26 through 29 the conveyor wheel M is schematically inscribed with a number of positions I to VI, on which bags 999 are held in radial direction by levers 230 and 231.

Figure 26:
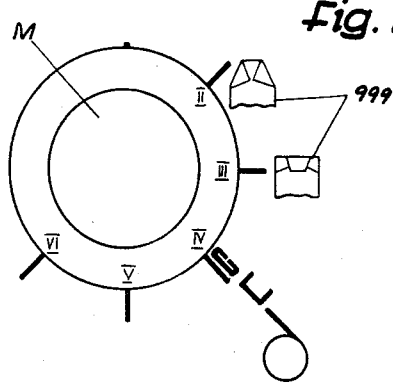
Figures 26 through 29 are schematic illustrations of the interlock between the sealing-fold forming device and the wire feeding and staple forming device.
Figure 27:
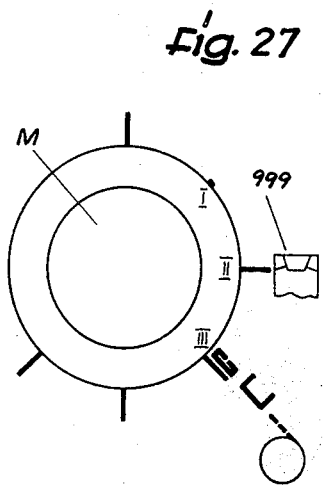
Figure 28:
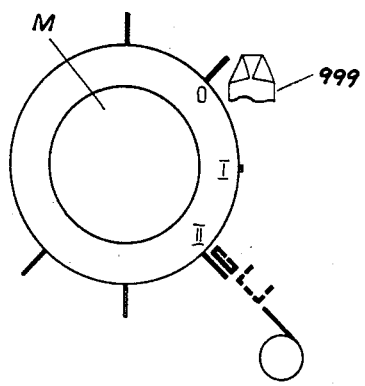

In Figure 26 it can be seen that at position I for some reason no bag has been picked up by levers 230 and 231. At point II the bag there receives the first sealing fold, at point III the bag there receives the second sealing fold and point IV is just opposite the binding device. At the binding device one staple is knocked into the fold, a second staple is formed, and the wire fed for the next operation. If point I, which has no bag, is moved one step of the conveyor wheel (Fig. 27), the bag of point III is opposite the binding device, while the bag of point II receives the second sealing fold.

In this position of the conveyor wheel the feeling device, mounted on the device for forming the first fold, does not find any bag at point I. This feeling device therefore controls the wire feeding in such a way that no wire feed takes place.

If the conveyor wheel M turns another step (Fig. 28) point I is in front of the second fold-forming device, and point II is opposite the binding device. Now the clamp, which was formed during the previous step, is knocked in, but no new clamp is formed and prepared, because during the preceding operation no wire feed took place. But now a wire feed takes place, because a bag is now again at point O opposite the device for forming the first fold.

Figure 29:
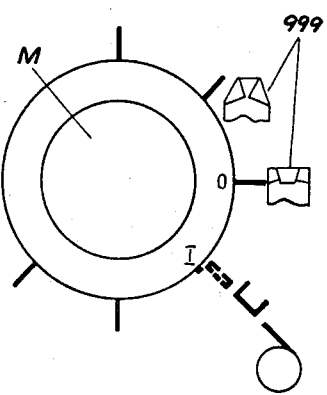
Figure 33:
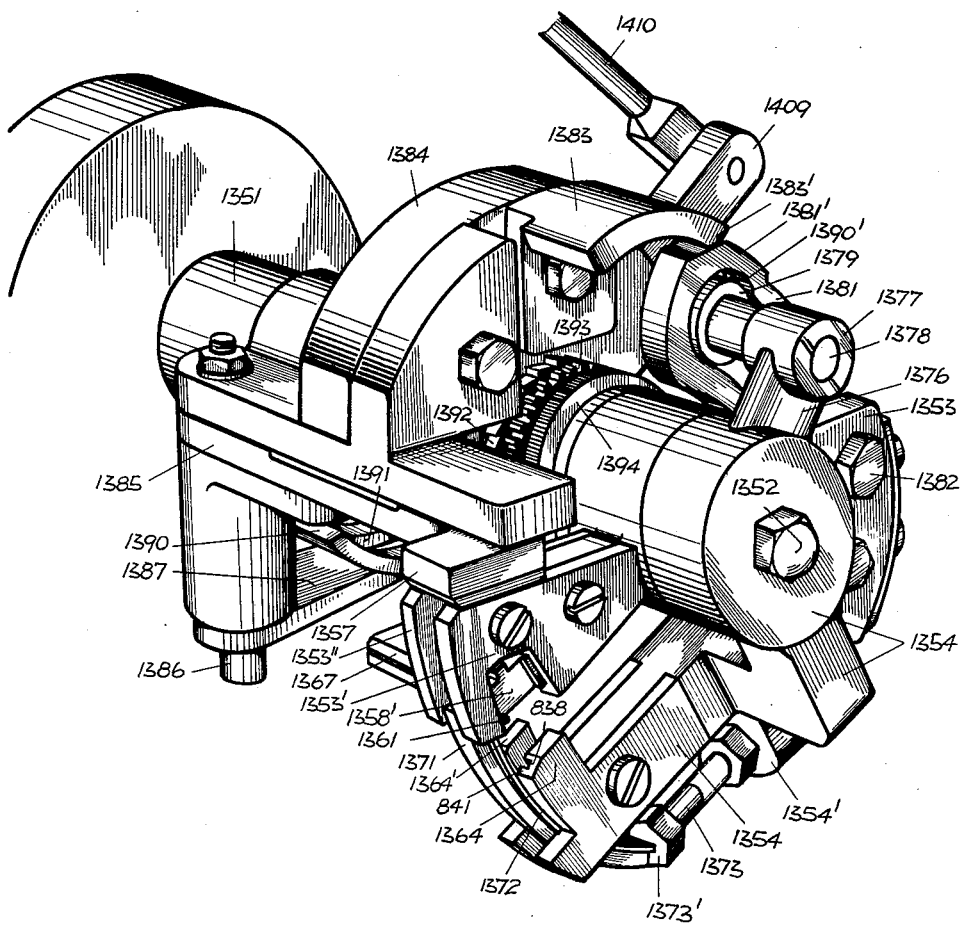
Figure 33 is an enlarged perspective view of a preferred embodiment of a staple forming and driving mechanism.
Figure 34:
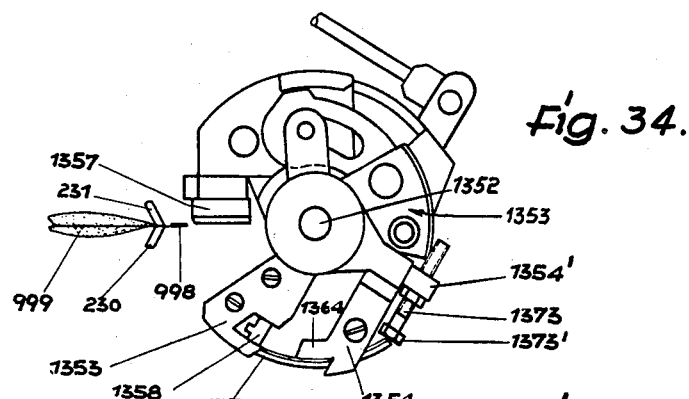
Figure 34 is a side elevation of the stapling mechanism of Figure 33.
Figure 35:
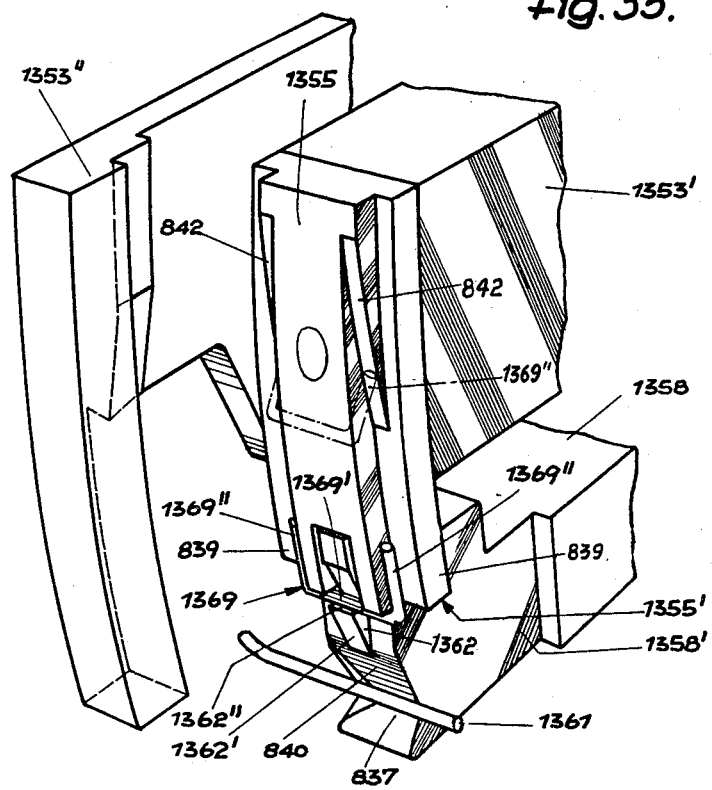
Figure 35 is an exploded perspective view of the staple forming and positioning dies of the device of Figure 34.

In Figure 29 point I is opposite the binding device. It is obvious that as there was no bag at point I no bag was prepared and no clamp can be knocked in, because no clamp was formed and placed in prepared position during the preceding operation. But now again a clamp is formed and prepared from the wire piece fed in the last operation and the wire again is fed.

To accomplish this, the previously mentioned two-armed lever 416 is furnished with a feeler 413 which finds out whether a bag has been fed to the first fold-forming device.

Figure 23 shows in its upper portion the position of the two-armed lever 416 when the feeler 413 cannot move through the breakthrough 415 of folding blade 295 because of the presence of a bag 999 in the folding device. As described above, rotation of lever 416 during folding is counterclockwise.

On sleeve 296 a bolt 417 is fixed on which lever 418 is rotatably mounted, which in turn is fixed to lever 419, also rotatably mounted on bolt 417. A pawl 420 is mounted at the end of lever 418 at 421. Pawl 420 is urged counterclockwise by the pressure of spring 422 and has a limiting stop pin 423.

As folding lever 294 with two-armed lever 416 moves from the starting position (Fig. 30) before the folding process, into the final position (Fig. 23), pawl 420 is affected only very slightly, if a bag is positioned in the folding device. However, if there is no bag fed into the folding device, feeler 413 can penetrate the breakthrough 415 of folding blade 295 permitting further counterclockwise movement of two-armed lever 416 from that shown in Figure 23 to the position shown in Figure 31. In this position pawl 420 can move under pressure of spring 422 below nose 424 of two-armed lever 416, until stopped at pin 423.

The folding lever 294 and also two-armed lever 416 return in a clockwise direction (Fig. 31), after the folding operation so that when no bag was present nose 424 of two-armed lever 416 presses against the front surface 420' of pawl 420 and turns lever 418, which carries pawl 420, clockwise around the axis of bolt 417, until the nose 424 has slid down off the front surface 420' of pawl 420 and passes the pawl. This point is shown in Figure 32.

This rotation of lever 418 is transmitted through lever 419 fixed thereto to one end of a rod 410, the other end of which is pivoted to lever 409 (Figs. 23 and 32). Lever 409 is fixed on bolt 408 on which lock pawl 411 is also fixed, bolt 408 being rotatably mounted on mounting 384.

Therefore, the movement of lever 418 at the beginning of the reverse movement of folding lever 294 moves lock pawl 411 out of locking wheel 392. Lock pawl 411 is held in this position by catch 425, formed like a two-armed lever, which is rotatably mounted on bolt 426, which is also mounted on mounting 394. One side of catch 425 is pulled against lever 409 by tension spring 427. Both lever 409 and catch 425 have a nose 409' and 425', respectively, which hold lever 409 in its released position, therefore maintaining lock pawl 411 released, after nose 424 of lever 416 has passed pawl 420.

The release of pawl 411 as explained above, renders the wire feeding device inoperative.

Simultaneously with the reverse movement of folding lever 294 of the first fold-forming device, the reverse motion of outer cover 353 of the stapling device takes place. This reverse movement is effected by a rotation of shaft 352. This shaft carries the bent surface 390, which contains closed curve 391 for controlling the movement of anvil 357.

At the end of the reverse motion of outer cover 353 the edge 390' (Fig. 32) of the vent surface pushes against the side 425' of catch 425 and rotates it around bolt 426. Nose 425' of catch 425 then moves along nose 409' of lever 409 until the edge of nose 409' has passed the edge of nose 425'. Tension spring 427 is temporarily stretched by this operation and thus pulls lever 409 rotating lock pawl 411 so that it comes into engagement again with lock wheel 392 after the edges 409' and 425' have passed since it cannot move catch 425, because the catch is held by bent surface 390. Figure 25 is a view of the assembly of the side opposite to that shown in Figures 23 and 32.

I claim:

1. An improved stapling mechanism for forming staples and driving them one at a time into work pieces in continuous production, said mechanism including a main axle, means to oscillate said axle forward and then reverse less than a full revolution, a first arm fixed onto said axle and carrying an arcuate staple driver and a pair of staple bending dies concentric with and behind said driver, a second arm rotatably mounted on said axle and comprising a staple guiding and forming member concentric with the inner side of said driver and dies, a staple positioning plunger recessed in said forming member and spring urged against said die, a cam carried on one of said arms and a cooperating cam surface carried on the other arm, and a stationary member cooperating with said cam and surface to lock said arms together for a first part of their forward stroke and then to unlock them to permit said first arm to rotate forward while said second arm is stationary.

2. The structure as in claim 1 wherein said staple positioning plunger is approximately radially positioned and movable on the lower or rear side of said guiding member and has a narrow front nose with a staple holding step on its forward or upward corner and an outward and forward cam surface beneath said step, said driver and bending die having a central cutout portion into which said nose can project, whereby when said driver is retracted said nose can project radially outward into the path of travel of said driver and hold a staple in position for driving on the next stroke.

3. The structure as in claim 2 wherein said guiding and forming member at its lower end defines a channel thicker than a staple, the channel tapering together upward to a thickness equal to the staple.

4. An improved stapling mechanism comprising an anvil, a staple forming and guiding member adapted to move against said anvil with a workpiece clamped therebetween, said member defining a narrow enclosed channel having walls which taper to a greater thickness and width below said anvil, a staple positioning arm lying transverse to said member along a line substantially below said anvil, said arm having a narrow nose portion and a wider body portion from which the nose projects, the body portion being movable beneath a right angle staple forming shoulder on said member, said nose projecting transversely through a cutout portion of said shoulder, said nose having three outward and upward cam surfaces defining two notches the first of which is level with said forming shoulder, the second notch being below said shoulder, and a driving and forming die having a forward portion movable through said channel and a rear portion in the form of two parallel right-angle shoulders which cooperate with said forming shoulder to bend a staple, and means to feed a short length of wire transversely into said second notch when said parallel shoulders are retracted below said forming shoulder.

5. The structure as in claim 4 wherein said nose projects into the path of said die when it is retracted whereby a staple previously formed by said shoulders is pushed outward and held free of them to be picked up and driven by said die on the next stroke.

6. The structure as in claim 5 wherein the forward part of said driving die facing said nose is grooved in its center region along its length so that said nose can project closer to said die when no staple is present than when one is present whereby a staple is positively held away from said shoulder when said die is retracted and until the next stroke.

7. An improved stapling mechanism comprising an anvil, a staple guiding member adapted to move against said anvil, a driving die adapted to move through said guiding member and having a rearward pair of spaced shoulders offset to one side, a staple forming plunger having a square shoulder transverse to said guiding member and having a nose adapted to project into the path of said die, said nose having a forward staple positioning step and an outward and forward cam surface behind said step adapted to bear against said die and displace said nose, said square shoulder and said spaced shoulders cooperating on a forward stroke of said die to form a staple from a straight piece of wire, said spaced shoulders having outward and backward sloping grooves which during the forming of a staple move it outward relative to said square shoulder and into engagement with said nose step, and means to feed a short length of wire transversely across said square shoulder during a reverse stroke of said die.

8. In a tea bag machine of the character described, means for advancing a tea bag in steps past a first, a second and a third station, stapling means for applying a staple to close a tea bag as it stands at said third station, said stapling means including wire feeding and shearing means, wire bending means, and staple driving means, said bending means and driving means operating simultaneously on a forward stroke of said stapling means to form one staple and to apply a staple previously formed to a bag at said third station, said feeding means operating on a reverse stroke of said stapling means to supply a short length of wire from a continuous roll thereof to said bending means, and interlock means for sensing the presence or absence at said first station of a tea bag and if there is a bag for permitting said feeding means to operate but if there is no bag for preventing said feeding means from operating.

9. A stapling mechanism of the character described comprising an anvil, a first housing pivotally mounted on an axle and having a surface movable toward or away from said anvil, a second housing pivotally mounted on said axle, and having a staple driving arm adapted to drive a staple through a tea bag against said anvil, a first cam surface carried on said second housing, a second cam surface carried on said first housing and being adapted to cooperate with said first surface, a fixed cam surface engageable with said second surface, and in cooperation therewith and with said first surface to lock said housings to each other when they rotate together from an initial position to an intermediate position, then to unlock them and permit said second housing to rotate to a final position while said first housing is stationary, then to lock them together again, after said second housing has rotated from said final to said intermediate position, while both housings rotate back to initial position from said intermediate position.

10. In a tea bag machine of the character described, means to hold a tea bag stationary in a position to have a string handle stapled to it, means for placing a length of string generally at right angles to the end of the bag, and stapling means for fastening the string folded U shape across the edge of the bag on both sides thereof, said stapling means comprising a swingable staple driving arm and bag grasping surface, and a rotatable anvil adapted to cooperate with said arm to grasp said bag to fold said string across the edge thereof and to drive a staple through said bag to engage said string on each side of said bag.

References Cited in the file of this patent

UNITED STATES PATENTS

| | | |
|---|---|---|
| 919,791 | Stringer | Apr. 27, 1909 |
| 1,796,143 | Davidson | Mar. 10, 1931 |
| 1,854,310 | Lawson | Apr. 19, 1932 |
| 1,937,825 | Lawson | Dec. 5, 1933 |
| 1,994,255 | Rosenmund | Mar. 12, 1935 |
| 2,226,598 | Wright | Dec. 31, 1940 |
| 2,563,173 | Jackson | Aug. 7, 1951 |